United States Patent [19]

Franek

[11] 4,109,500

[45] Aug. 29, 1978

[54] CREATING LINES OF WEAKNESS IN SHEET MATERIAL

[75] Inventor: Jozef T. Franek, Chorleywood, England

[73] Assignee: Metal Box Limited, Reading, England

[21] Appl. No.: 508,625

[22] Filed: Sep. 23, 1974

[30] Foreign Application Priority Data

Sep. 27, 1973 [GB] United Kingdom ............... 45195/73

[51] Int. Cl.² ............................................ B21B 15/00
[52] U.S. Cl. ...................................... 72/203; 72/206; 83/1; 83/9; 83/51; 83/495; 83/675; 225/2; 225/3; 225/96.5; 428/43
[58] Field of Search ................. 83/496, 495, 1, 51, 83/52, 675, 665, 9, 500–503; 225/2, 94, 96, 97, 93, 3, 96.5; 72/206, 203, 204; 428/43

[56] References Cited

U.S. PATENT DOCUMENTS

| 1,091,204 | 3/1914 | Ferres ........................................ 83/9 |
| 2,053,375 | 9/1936 | Nicholas ................................. 83/9 X |
| 2,109,921 | 3/1938 | Leach .................................. 83/495 X |
| 3,205,094 | 9/1965 | Erlandson ............................... 428/43 |
| 3,312,135 | 4/1967 | Mraz ..................................... 83/675 |
| 3,566,725 | 2/1971 | Sutyak ..................................... 83/9 X |
| 3,595,455 | 7/1971 | Pace ..................................... 225/97 X |
| 3,641,853 | 2/1972 | Jungbeck ............................... 83/51 X |

Primary Examiner—Frank T. Yost
Attorney, Agent, or Firm—Charles E. Brown

[57] ABSTRACT

A slitting machine for longitudinally slitting sheet tinplate to form blanks for can bodies has two parallel horizontal shafts carrying cutter rolls conventionally arranged in pairs of overlapping rolls so as by a shearing action to slit the sheet tinplate driven to pass between the shafts. The shafts also carry further rolls which may be identical to the cutter rolls but are of a smaller diameter. Like the cutter rolls, these further rolls are arranged in pairs; however, by virtue of their smaller diameter they have a small radial clearance. By partially shearing the tinplate they therefore form the tinplate with lines of weakness parallel to the lines of slitting simultaneously made by the cutter rolls. To accommodate the machine to different thicknesses of tinplate the shaft spacing may be adjustable and/or the rolls may be readily removable for replacement by similar rolls of a different diameter.

6 Claims, 6 Drawing Figures

CREATING LINES OF WEAKNESS IN SHEET MATERIAL

This invention relates to methods and apparatus for creating lines of weakness in sheet metal and more particularly, but not exclusively, to the manufacture of can bodies 'two-high' in body makers.

Hitherto lines of weakness have been formed in sheet metal by impressing suitably shaped tools into the material to create grooves or discontinuities of surface at which the material is of reduced thickness. Such lines of reduced thickness have been made, in the case of easyopening can ends, by means of power presses; in the case of key-opening can bodies they have been made by suitably shaped wheels which roll grooves into the material being treated.

According to the present invention from one aspect there is provided a method of making a line of weakness in sheet material, wherein the sheet material is caused to pass between at least one pair of cooperating members which are arranged and disposed to partially shear the material.

It is known to make can bodies by taking a sheet of tinplate, slitting it into strips, and then slitting each strip transversely to form rectangular body blanks. The blanks are fed to the hopper of a body maker and are then passed sequentially through grain breaking corner notching, seam hook forming, cylinder forming and side seam locking and soldering stations of the body maker to make the can bodies. When rapid production of short cans is needed the 'two-high' method of manufacture is sometimes used. In this method blanks are formed each equivalent to two can body blanks joined along adjacent sides which form circular end edges in the finished bodies. After its formation each double blank is fed to the hopper of a body maker; this is provided with a scoring means which scores the double blank centrally so as to define the component blanks. After scoring the double blank passes through the body maker in the usual way; the cylinder which emerges from the body maker is then split in two along the line of weakness to separate its components parts, and the latter are individually completed to form two can bodies as desired.

The formation of the desired lines of weakness in the body maker, however, has tended to lead to increased production costs. In accordance with the invention from a further aspect there is provided a slitting machine, which comprises a pair of parallel shafts each carrying a plurality of rotatable members, the said members of the two shafts being arranged to cooperate in pairs, the cooperable members of at least one said pair partially overlapping one another radially of their said shafts and closely adjacent one another longitudinally thereof whereby by shearing sheet material caused to pass between the shafts completely to sever the material, the cooperable members of at least one further said pair being radially spaced from one another and so arranged and longitudinally disposed as by locally reducing the thickness of the said sheet material by partial shearing to create a line of weakness therein.

A slitting machine as defined in the preceding paragraph may be a conventional slitting machine which has been adapted, by the provision of undersized cutting rolls in addition to the correctly sized (and therefore fully effective) cutting rolls, to perform scoring as well as slitting. This adaptation may be achieved quickly and cheaply. By removing the need for any other specially provided scoring means such an arrangement tends to lower production costs and increase efficiency.

The invention further provides can body blanks and cans made by a method as defined above.

One embodiment of the invention will now be described by way of example, and with reference to the accompanying drawings in which.

Figure 5:
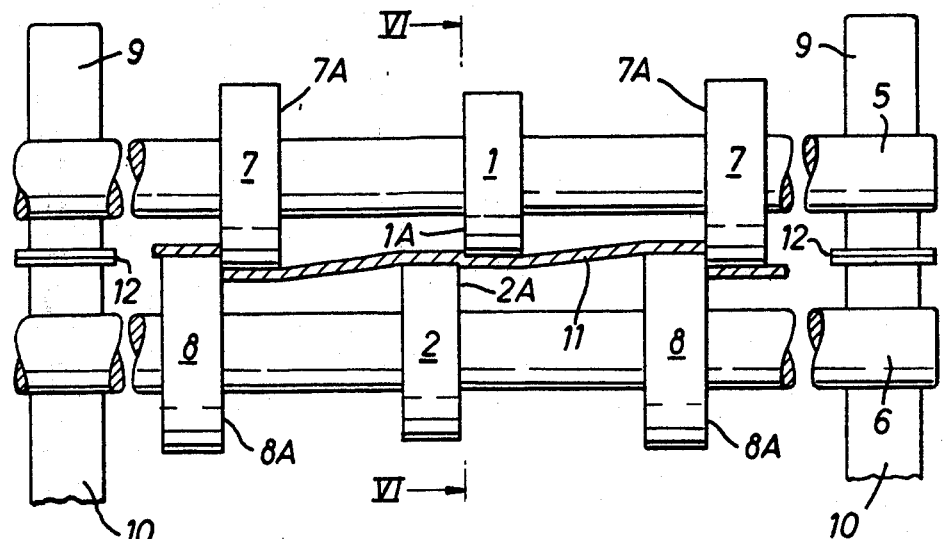
FIG. 5 is a diagrammatic elevation of a slitting machine embodying the invention.
Figure 6:
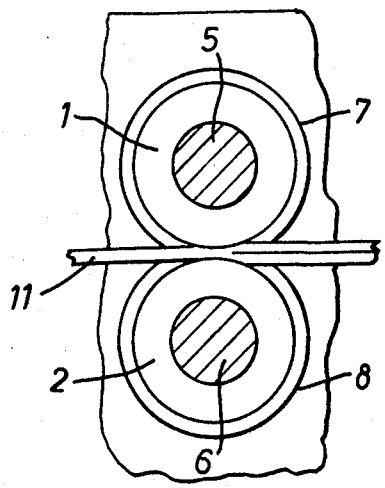
FIG. 6 is a sectional elevation on the line VI—VI of FIG. 5

Referring firstly to FIGS. 5 and 6 of the drawings, a slitting machine has an upper horizontal shaft 5 and lower horizontal shaft 6 mounted for rotation in parallel relation by means of a pair of mounting blocks 9,10 at each end.

At regular intervals along its length the shaft 5 carries alternate larger diameter rolls 7 and smaller diameter rolls 1, with larger diameter rolls 7 at either end. Correspondingly, the shaft 6 carries alternate larger diameter rolls 8 and smaller diameter rolls 2. The rolls 1,2 have a smaller diameter than the rolls 7,8 but otherwise are identical thereto. The rolls 1,2,7 and 8 are splined, clamped, shrunk or otherwise made fast with their respective shafts.

The larger diameter rolls 7,8 of the two shafts have a combined radius which is greater than the spacing of the axes of rotation of the shafts 5,6; they accordingly overlap radially between the shafts. In known manner they are arranged in pairs of adjacent rolls each pair of which is capable of shearing sheet tinplate guided and driven (by means not shown) to pass horizontally between the shafts, so as to slit, i.e. completely sever, the tinplate; to effect slitting the rolls of each pair cooperate at hardened annular side faces 7A,8A which slide over one another with scissors action as the shafts 5,6 rotate in opposite directions. In FIGS. 5 and 6 a sheet of tinplate is shown passing between the shafts and indicated generally by the reference numeral 11.

The smaller diameter rolls 1,2 of the two shafts are likewise arranged to cooperate in pairs. However, in contrast to the rolls 7,8 the rolls 1,2 are so dimensioned that in each pair a small radial clerance exists between the rolls. Furthermore, the rolls 1,2 of each pair are so relatively disposed along their respective shafts that a small axial clearance exists between their adjacent, but separate, hardened and annular side faces 1A,2A.

Figure 1:
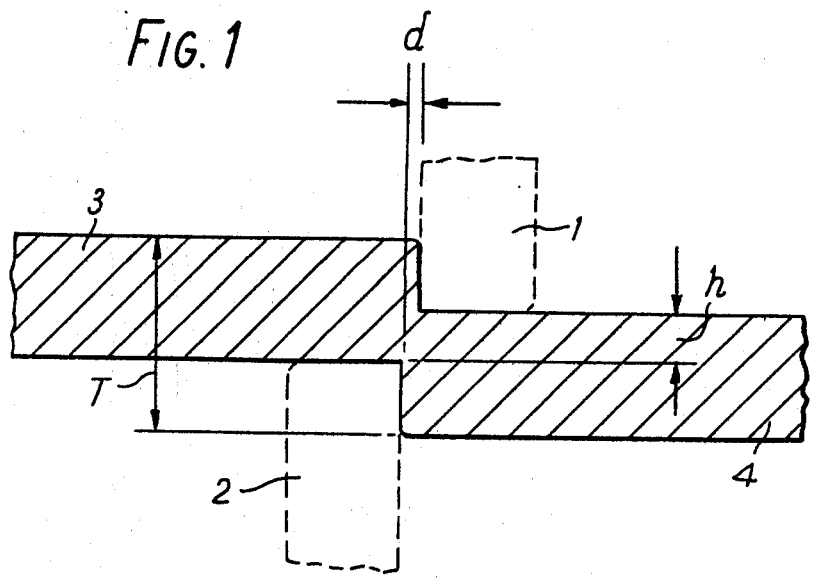
FIG. 1 is a diagrammatic representation of a pair of slitting rolls set to achieve partial shearing.

As is now to be described in rleation to FIG. 1, the pairs of rolls 1,2 each act to only partially shear the sheet tinplate 11 as it passes between them. The line along which this partial shearing occurs constitutes a desired line of weakness in the tinplate emerging from the machine.

In FIG. 1 there is shown one pair of the rolls 1,2 in the immediate vicinity of their interaction on the sheet of tinplate 11. From FIG. 1 it will be seen that the rolls are separated axially (i.e. horizontally) by a distance '$d$' and radially (i.e. vertically) by a distance '$h$'. The distance '$d$' is typically equal to one tenth of the final metal thickness '$T$'; the distance '$h$' determines the required ease of final separation. On passing between the rolls a portion 3 of the material is displaced vertically from the remainder, denoted 4, so increasing the overall thickness of the material to 'T' in the region treated. The reduced thickness of metal between the portions 3,4 forms the desired line of weakness.

It will therefore be appreciated that the sheet tinplate emerging from the machine will be severed completely along lines corresponding in lateral position to the pairs of rolls 7,8 and will be formed with lines of weakness corresponding laterally to the pairs of rolls 1,2. Advantageously, the slitting machine is of the type wherein the tinplate will have been severed transversely at regular intervals by a previous pass through slitting rolls similar or identical to the rolls 7 and 8, in a direction perpendicular to the direction through the rolls. The tinplate 11 therefore emerges from the rolls 1,2,7 and 8 as rectangular blanks each formed with a centrally disposed line of weakness.

Alternatively, the tinplate 11 passing between the shafts 5,6 may be drawn from a reel, in which case the blanks are subsequently formed by transverse cuts made on the tinplate after its passage through the rolls 1,2,7 and 8.

The blanks formed by the rolls 1,2,7 and 8 or subsequently thereto as described above are used for the manufacture of two-high can bodies. Each blank is then subjected, as one piece, to the normal can-making operations of grainbreaking, corner notching, seam hook forming, cylinder forming, and side seam locking and soldering. Thereafter the two rudimentary can bodies which each blank forms are separated from one another along the line of weakening formed in the blank (which must accordingly then be circumferential), after which the bodies are completed individually.

It will be appreciated that by providing a second pair of the rolls 1,2 between successive pairs of the rolls 7,8 the arrangement shown can readily be adapted for the production of blanks either for three-high can bodies or for key-opening cans. For the latter application the adjacent pairs of rolls 1,2 are closely disposed (or are combined together) so that the lines of weakness which they form define the relatively narrow tear-off strips required for the finished product.

In passing it will be noted that in the application of the invention to the manufacture of two-high or three-high can bodies the lines of weakness formed in the blanks do not appear in the finished product.

Figure 2:
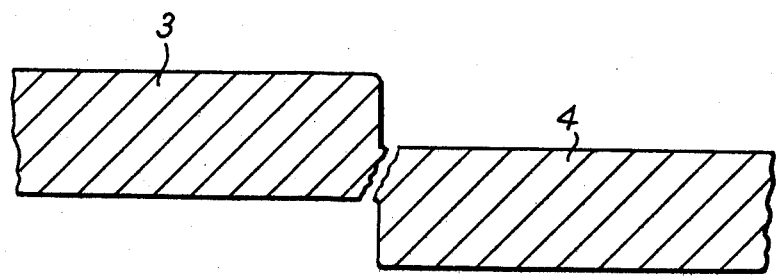
FIG. 2 shows material of FIG. 1 after it has been parted subsequent to the partial shearing operation.

In some applications of the invention the tinplate treated as shown in FIG. 1 will be fractured along the lines of weakness formed by the rolls 1,2 without any subsequent rolling operation such as would be achieved by a grain breaker. FIG. 2 illustrates the nature of the fracture which would then occur. The substantially burr-free nature of the surfaces of the portions 3,4 at the fracture can be easily seen.

Figure 3:
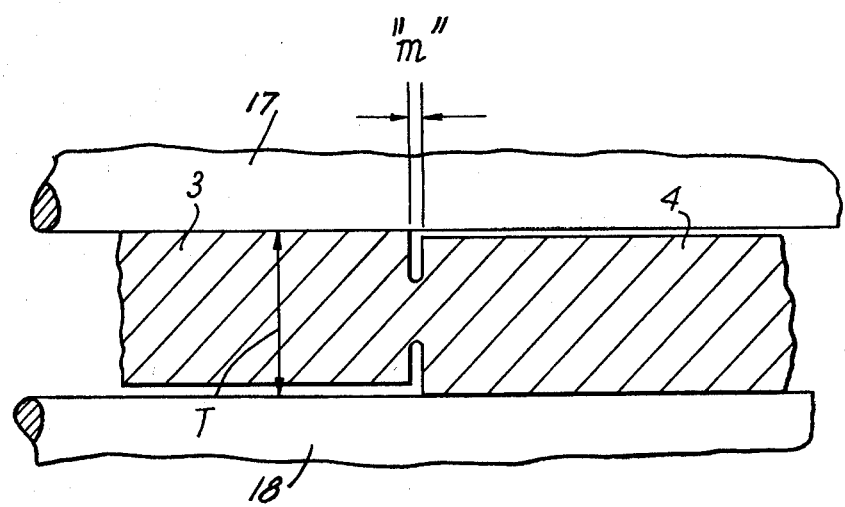
FIG. 3 shows the material of FIG. 1 after subjection to a subsequent rolling operation.

FIG. 3 corresponds to FIG. 1 and shows the tinplate after it has been subjected to a grain breaking (or other rolling) operation following the partial shearing operation of FIG. 1. It will be seen that the portions 3 and 4 are pushed almost into the same plane and the overall thickness 'T' is reduced to nearly the original material thickness. The step in the material thus takes the form of a groove of minimal width 'm'.

Figure 4:
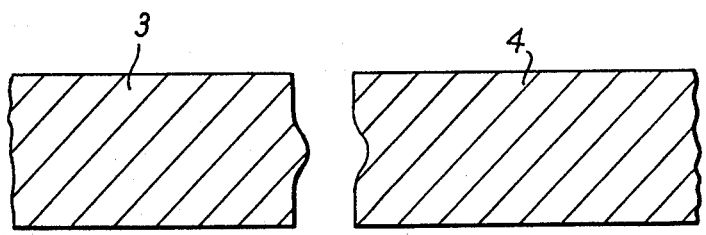
FIG. 4 shows the material of FIG. 3 after it has been parted subsequent to the rolling operation.

FIG. 4 corresponds to FIG. 2 and accordingly shows the material of FIG. 3 after fracture. Again, the substantially burr-free nature of the fracture can be seen.

Reverting again to the arrangement shown in FIGS. 5 and 6, in order to enable the machine to operate on sheets 11 of different thicknesses the relative spacing of the shafts 5,6 in the vertical sense may be made adjustable by provision for relative vertical movement of the mounting blocks 9,10. As shown in FIGS. 5 and 6, the desired spacing between the shafts may be set and maintained by the insertion of calibrated shims 12 between the mounting blocks. Other ways of adjusting and maintaining the shaft spacing are, however, possible.

Instead of, or in addition to, providing for adjustment of the spacing of the shafts 5,6, accommodation of the machine to materials of different sheet thicknesses may be effected by making the rolls 1,2 and, possibly, 7,8 readily detachable from the shafts for replacement by other such rolls of different diameter. By provision of a set of rolls of graded diameters, the machine may be enabled to simultaneously slit and score sheets 11 having a substantial range of thicknesses.

Although not shown, it is to be understood that means are provided for the machine of FIG. 5 for driving the shafts 5,6 in opposite senses. Such means, which are conveniently provided at one end of the shafts and may comprise, for example, engaging gears, should be such as to accommodate the above-described relative displacement (if any) of the shafts.

In a modification of the arrangement of FIGS. 5 and 6, the shafts 5,6 are non-rotatable and the rolls 1,2,7 and 8 are individually driven for rotation on the shafts by, for example, further rollers contacting their peripheries.

In the described embodiment the two rolls 1,2,7 and 8 of each pair of co-acting rollers are of the same diameter; however, this is not essential.

The invention includes within its scope methods of forming lines of weakness in sheet material by partial shearing, without any simultaneous slitting operation.

The invention may have application with sheet materials other than tinplate. For example, it is envisaged that the invention may be used with plastics or paper-based sheet material, with aluminium or with tin-free steel.

What we claim is:

1. Apparatus for making lines of weakness in sheet material, said apparatus comprising at least a pair of parallel rotating shafts having at least one cutter on each of said shafts, said cutters being axially offset and spaced apart transversely of said shafts to coact and cause partial slitting of material conveyed between them, said cutters being operative to offset adjacent portions of sheet material on opposite sides of a line of weakness formed therein out of an original plane of the sheet material, and means for urging the resultant offset sheet material portions back toward a generally planar state.

2. A method of forming lines of weakening in sheet material comprising the steps of providing a pair of rotating cutters arranged in generally opposed axially offset relation for rotation about parallel axes, setting said rotating cutters apart a transverse distance less than the thickness of the sheet material, and passing sheet material through said cutters with said cutters progressively offsetting adjacent portions of the sheet material normal to the original plane of the sheet material and defining between the adjacent portions a line of weakness, the material being further worked following the formation of the line of weakness with the offset adjacent portions of the material being returned towards a planar state.

3. The method of claim 2 wherein the adjacent portions of the material on opposite sides of the line of weakness are axially spaced.

4. Sheet material partially sheared by the method of claim 2 and having aligned weakening grooves formed in opposite faces thereof.

5. A method of forming lines of weakening in sheet material comprising the steps of providing a pair of rotating cutters arranged in generally opposed axially offset relation for rotation about parallel axes, setting said rotating cutters apart a transverse distance less than the thickness of the sheet material, and passing sheet material through said cutters with said cutters progressively offsetting adjacent portions of the sheet material normal to the original plane of the sheet material and defining between the adjacent portions a line of weakness, the axial spacing of the cutters being a distance less than the thickness of the material, and the material being further worked following the formation of the line of weakness with the offset adjacent portions of the material being returned towards a planar state and the adjacent portions being axially spaced on opposite sides of the line of weakness.

6. A method of forming lines of weakening in sheet material comprising the steps of providing a pair of rotating cutters arranged in generally opposed axially offset relation for rotation about parallel axes, setting said rotating cutters apart a transverse distance less than the thickness of the sheet material, and passing sheet material through said cutters with said cutters progressively offsetting adjacent portions of the sheet material normal to the original plane of the sheet material and defining between the adjacent portions a line of weakness, the axial spacing of the cutters being a distance less than the thickness of the material, the material being further worked following the formation of the line of weakness with the offset adjacent portions of the material being returned towards a planar state and the adjacent portions being axially spaced on opposite sides of the line of weakness.

* * * * *